3,830,928
SUBSTITUTED PHENYLTETRAZOLES AS
COCCIDIOSTATS
Helmut H. Mrozik, Matawan, N.J., assignor to
Merck & Co., Inc., Rahway, N.J.
No Drawing. Filed June 9, 1972, Ser. No. 261,464
Int. Cl. A61k 27/00
U.S. Cl. 424—269      4 Claims

ABSTRACT OF THE DISCLOSURE

Nitrophenyl-5-aminotetrazoles are active antiparasitic agents and are particularly active coccidiostats. The nitrophenyl-5-aminotetrazoles are included in compositions useful for the prevention and cure of coccidiosis in poultry.

SUMMARY OF THE INVENTION

This invention relates generally to the usefulness of certain nitrophenyl-5-aminotetrazoles for the treatment and prevention of certain parasitic diseases particularly coccidiosis in poultry. In addition, this invention relates to compositions including said certain nitrophenyl-5-aminotetrazoles, as the active ingredient, intimately admixed with an inert carrier for administration to animals infected with coccidiosis. It is therefore an object of this invention to provide a method of treatment for coccidiosis using certain nitrophenyl-5-aminotetrazoles. It is also an object of this invention to include said nitrophenyl-5-aminotetrazoles in compositions for administration to poultry which compositions will prevent or treat coccidiosis. Further objects will become apparent on a further reading of the description.

The nitrophenyl-5-aminotetrazoles which have been found to be very active in treating and preventing coccidiosis in poultry are of the following structural formula:

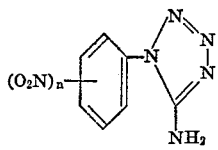

wherein $n$ is 1 or 2. The compound of the above structural formula is deemed to include the acid addition salts thereof. Such salts are formed by contacting the above compounds with a mineral acid such as hydrochloric, sulfuric, nitric, or phosphoric acids.

The compounds of this invention hereinabove described, when used as coccidiostats in poultry may be administered orally as a component of the animal feedstuff, in the drinking water, in salt blocks, and in unit dosage forms such as tablets, boluses, or drenches; or parenterally either in solution or in suspension in an aqueous medium. The vehicle in which the active ingredient is distributed should be one that is chemically compatible with the particular compound selected, non-inhibiting with respect to the action of the coccidiostat and essentially non-toxic to the host animal under the conditions of use. The preferred embodiments of this invention are realized when the composition is orally administered to the animal as an adjunct to the animal's normal feed.

Coccidiosis is a common and widespread poultry disease caused by several species of protozoan parasites of the genus Eimeria, such as E. tenella, E. necatrix, E. acervulina, E. maxima, E. hagani, and E. brunetti. E. tenella is the causative agent of a severe and often fatal infection of the caeca of chickens, which is manifested by severe and extensive hemorrhage, accumulation of blood in the caeca, and the passage of blood in the droppings. E. necatrix attacks the small intestine of the chick causing what is known as intestinal coccidiosis. Related species of coccidia such as E. meleagridis and E. adenoides are causative organisms of coccidiosis in turkeys. When left untreated, the severe forms of coccidiosis lead to poor weight gain, reduced feed efficiency and high mortality in fowl. The elimination or control of this disease is, therefore, of paramount importance to the poultry raising industry.

Therefore, another preferred embodiment of this invention are the compositions containing the above phenyltetrazoles which may be successfully employed to cure and prevent the development of coccidiosis when administered to poultry. The active compounds are conveniently fed to poultry as a component of the feed of the animals although it may also be given dissolved or suspended in the drinking water. According to a preferred aspect of the invention, novel compositions for the treatment of coccidiosis are provided which comprise one or more phenyltetrazoles intimately dispersed in or intimately admixed with an inert edible carrier or diluent. By an inert edible carrier or diluent is meant one that is nonreactive with respect to the tetrazole, and that may be administered with safety to the animals to be treated. The carrier or diluent is preferably one that is or may be an ingredient of the animal feed.

The compositions which are a preferred feature of this invention are the so-called feed supplements in which the phenyltetrazole is present in relatively large amounts and which are suitable for addition to the poultry feed either directly or after an intermediate dilution or blending step. Examples of carriers or diluents suitable for such compositions are animal feed ingredients such as distillers' dried grains, corn meal, citrus meal, fermentation residues, ground oyster shells, Attapulgus clay, wheat shorts, molasses solubles, corn cob meal, edible vegetable substances, toasted dehulled soya flour, soybean mill feed, antibiotic mycelia, soya grits, crushed limestone and the like. The tetrazole compound is intimately dispersed or admixed throughout the solid inert carrier by methods such as grinding, stirring, milling, or tumbling. By selecting proper diluents and by altering the ratio of carrier to active ingredient, compositions of any desired concentration may be prepared. Formulations containing from about 1% to about 40% by weight and preferably from about 2–25% by weight, of the phenyltetrazoles are particularly suitable for addition to poultry feedstuffs. Those having from about 5–20% by weight of coccidiostat are very satisfactory. The active compound is usually dispersed or mixed uniformly in the diluent but in some instances may be sorbed on the carrier. Since it is convenient for the feed manufacturer to use about one pound of feed supplement for each ton of finished feed, the preferred concentration in the supplement is usually a function of the level of active ingredient desired in the finished feed.

Very low levels of phenyltetrazoles in an animal feed are sufficient to afford the poultry good protection against coccidiosis. Preferably the compound is administered to chickens in an amount equal to about 0.00025% to 0.05% by weight of the daily feed intake. Optimum results are obtained by feeding at a level of about 0.001 to 0.01% by weight of the finished feed. For therapeutic treatment of an established coccidial infection, higher amounts of phenyltetrazoles, i.e. up to about 0.05% by weight of the feed consumed, may be employed. The most advantageous dosage level will, of course, vary somewhat with particular circumstances such as the type and severity of the coccidial infection to be treated.

For treating poultry, the feed supplement is uniformly dispersed in the animal feed by suitable mixing or blending procedures.

Usually the feed supplements are further diluted with materials such as corn meal or soybean meal before being incorporated in the animal feed. In this intermediate processing step the level of the phenyltetrazole in the carrier is brought down to about 0.1%–1.0% by weight. This dilution serves to facilitate uniform distribution of the coccidiostat in the finished feed. The finished feed is one that contains a source of fat, protein, carbohydrate, minerals, vitamins, and other nutritional factors.

In the above discussion of this invention, emphasis has been placed on solid compositions wherein the active ingredient is mixed with an edible carrier in a feed supplement, in a so-called premix or in the final poultry feedstuff. This is the preferred method of administering the tetrazole of this invention. An alternate method of treatment is to dissolve or suspend the tetrazole compound in the drinking water of the animals. The quantity of coccidiostat which may be administered in this fashion is, of course, limited by the solubility of the product in water or by the quantity that may be suspended in the water without undue settling. Emulsifiers or surface active agents may be employed for this latter purpose.

This invention is not limited to coccidiostatic compositions having phenyltetrazole type compounds as the sole active ingredient. Also contemplated within its scope is what might be called "combined treatment" where a phenyltetrazole and one or more other coccidiostats are administered concurrently. For such purposes, compositions may be prepared containing this tetrazole compound admixed with one or more other coccidiostats such as sulfaquinoxaline, other sulfa compounds, 4,4'-dinitrocarbanilide-2-hydroxy-4,6-dimethylpyrimidine complex, 3,3'-dinitrodiphenyldissulfide, 5-nitrofurfural semicarbazone, amprolium, zoalene, buquinolate, ethopabate, and the like.

It will likewise be understood by those skilled in this art that special feed supplement formulations and finished animal feeds containing vitamins, antibiotics, growth-promoting agents and other nutritional substances may include the tetrazole compound of this invention. A typical product of this type is the following:

| Ingredient: | | Amount/lb. of Supplement |
|---|---|---|
| Riboflavin | grams | 0.64 |
| DL-calcium pantothenate | do | 2.10 |
| Niacin | do | 3.67 |
| Choline chloride | do | 50.00 |
| Vitamin B$_{12}$ concentrate | mg | 1.30 |
| Procaine penicillin | grams | 0.84 |
| Vitamin A (100,000 u/g.) | do | 3.38 |
| Vitamin D$_3$ (200,000 u/g.) | do | 0.68 |
| Arsanilic acid | do | 18.36 |
| Butylated hydroxy toluene | do | 23.15 |
| DL-methionine | do | 23.15 |
| 5-Amino-1-(m-nitrophenyl) tetrazole | do | 23.00 |
| Distillers' grains to 1 pound. | | |

Animal feed supplements having the following compositions are prepared by intimately mixing the substituted phenyltetrazole and the particular edible solid diluent or diluents:

A.

| | Lbs. |
|---|---|
| 5-Amino-1-(m-nitrophenyl)tetrazole | 12.5 |
| Distillers' dried grains | 87.5 |

B.

| | |
|---|---|
| 5-Amino-1-(p-nitrophenyl)tetrazole | 15.0 |
| Soya mill feed | 45.0 |
| Fine soya grits | 40.0 |

C.

| | |
|---|---|
| 5-Amino-1-(o-nitrophenyl)tetrazole | 5.0 |
| Molasses solubles | 95.0 |

D.

| | |
|---|---|
| 5-Amino-1-(3,4-dinitrophenyl)tetrazole | 15.0 |
| Corn distillers' grains | 55.0 |
| Corn germ meal | 30.0 |

These supplements are made by mechanical milling or mixing of the ingredients to insure uniform distribution of the active compound.

The compounds of this invention which are active antiprotozoal agents and are employed in the above anticoccidial compositions are prepared by a variety of synthetic organic chemical processes. The particular synthetic step and the particular order of a series of synthetic steps is determined by the substituent groups present on the desired final molecule and the sensitivity of those substituents to side reactions.

The preparation of the active compounds of this invention is best illustrated by the following flowsheet:

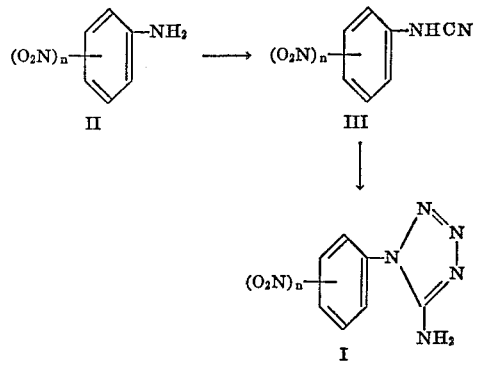

wherein $n$ is as previously defined.

In the preparation of compound I, an appropriately substituted aniline derivative (II) is treated with cyanogen bromide to form the cyanamide compound (III). The reaction is run in a solvent such as water, loweralkanols or mixtures thereof at an elevated temperature of from 40° C. to the reflux temperature of the reaction mixture. The duration of the heating period is very important as the formation of the cyanamide is in competition with the hydrolysis of the cyanamide to the phenyl urea compound. We have found it advantageous to follow the progress of the reaction with thin layer chromatography or other suitable analytical techniques. When the aniline is totally consumed the reaction should be stopped promptly. The reaction time is from 15 minutes to 2 hours.

The cyanamide is treated with hydrazoic acid in solution to form the amino tetrazole derivative I. The reaction is run in any non-reactive solvent such as ethanol, ether, benzene, toluene, xylene, and the like. The reaction is run at a temperature of from room temperature to 75° C., however, from room temperature to 60° C. is preferred since at higher temperatures the hydrazoic acid, being a gas, tends not to remain in solution, and yields are consequently reduced. The reaction is generally complete in from ½ to 5 days at 60° C. with longer periods generally needed for lower temperatures.

The following examples are presented in order to demonstrate the method of preparation of the above compounds. It should not be construed as limitative of the invention.

EXAMPLE 1 m-Nitrophenyl Cyanamide

A solution of 40 g. (0.29 moles) of m-nitroaniline in 40 ml. of ethanol and 200 ml. of water is heated to 70° C. on a steam bath. A solution of 30 g. (0.28 moles) of cyanogen bromide in 150 ml. of ethanol is added in 1 portion. The mixture is refluxed for ½ hour to avoid either an incomplete reaction or a hydrolysis of the product. The progress of the reaction is followed by thin layer chromatography. The solution is cooled to about 50° C. and a solution of 40 g. (0.61 moles) of potassium hydroxide in 300 ml. of water is added. The red solution is concentrated to remove the alcohol during which time a precipitate is formed. The mixture is cooled and the precipitate is formed. The mixture is cooled and the precipitate of urea is filtered. The filtrate is acidified with a 6N hydrochloric acid just to the point of the disappearance of the red color. The precipitate is filtered and washed with water. The solid material is dissolved in ether and the solution washed with sodium chloride solution, dried over magnesium sulfate, treated with charcoal, and filtered. The filtrate is concentrated and diluted with hexane. The product is filtered washed with hexane and dried affording 19.40 g. (41% of theoretical) of m-nitrophenyl cyanamide, m.p. 128–130° C.

A thin layer chromatography on silica gel eluting with 5% of methanol in methylene chloride showed one spot with a R$f$ of 0.66.

When in the above procedure o-nitroaniline, p-nitroaniline or 3,4-dinitroaniline is employed in place of m-nitroaniline there is obtained o-nitrophenylcyanamide, p-nitrophenylcyanamide and 3,4 - dinitrophenylcyanamide respectively.

EXAMPLE 2

Preparation of the Hydrazoic Acid Solution

A slurry of 130 g. (2 moles) of sodium azide in 130 ml. of water and a 3 liter, 3 necked flask is covered with 800 ml. of xylene stirred and cooled to 0–5° C. 54 ml. (98 g., 1 mole) of concentrated sulfuric acid is added dropwise with vigorous stirring such that the temperature does not exceed 10° C. Stirring at 5° C. was maintained until all the solid material was white and free flowing. The reaction mixture is filtered and the solid material washed with xylene. The combined filtrate and washings have a volume of 950 ml. Titration with 0.02N sodium hydroxide of a 2 ml. aliquot in water showed the concentration of hydrazoic acid to be 1.55N (77%). The solution is used as is in subsequent reactions.

EXAMPLE 3

5-Amino-1-(m-Nitrophenyl)Tetrazole

A solution of 19 g. (0.117 moles) of m-nitrophenyl cyanamide in 150 ml. of ethanol is combined with 250 ml. of 1.47N hydrazoic acid (0.368 moles) and stirred at 60° C. for 2 days. The reaction mixture is cooled and filtered. The solid material is washed with xylene and dried in a vacuum desiccator affording 18.6 g. of 5-amino-1-(m-nitrophenyl)tetrazole (77%) with a m.p. 176–177° C. Thin layer chromatography on silica gel in 5% methanol/methylene chloride shows a single spot with a R$f$ 0.34.

When in the above procedure o-nitrophenylcyanamide, p-nitrophenylcyanamide, or 3,4-dinitrophenylcyanamide is employed in place of m-nitrophenylcyanamide there is obtained 5-amino-1-(o-nitrophenyl)tetrazole; 5-amino-1-(3, 4-dinitrophenyl)tetrazole respectively.

What is claimed is:

1. A method for the prevention and treatment of coccidiosis in poultry which comprises orally administering to poultry an effective amount of a composition comprising an inert carrier and a compound having the formula:

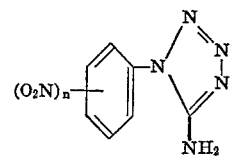

wherein $n$ is 1 or 2, said compound being present in said composition in an amount of from 0.00025 to 0.05% by weight.

2. The method of claim 1 in which said compound is present in said composition to the extent of from 0.001 to 0.01% by weight.

3. The method of claim 1 in which said compound is 5-amino-1-(m-nitrophenyl)tetrazole.

4. The method of claim 1 in which said compound is 5-amino-1-(p-nitrophenyl)tetrazole.

References Cited

UNITED STATES PATENTS 3,278,381   10/1966   Bossinger et al. _____ 424—269
3,549,765   12/1970   Enkoji et al. _____ 424—269

VINCENT D. TURNER, Primary Examiner

U.S. Cl. X.R.

260—308 D